United States Patent [19]
Harrison et al.

[11] Patent Number: 5,682,669
[45] Date of Patent: Nov. 4, 1997

[54] METHOD OF MAKING A MAGNETIC HEAD GIMBAL SUSPENSION ASSEMBLY WITH DOUBLE DIMPLE

[75] Inventors: Joshua C. Harrison; Kevin P. Hanrahan, both of Santa Barbara, Calif.

[73] Assignee: Applied Magnetics Corporation, Goleta, Calif.

[21] Appl. No.: 546,445

[22] Filed: Oct. 20, 1995

Related U.S. Application Data

[62] Division of Ser. No. 447,682, May 23, 1995, abandoned, which is a continuation of Ser. No. 189,911, Feb. 1, 1994, abandoned.

[51] Int. Cl.$^6$ .................................................. G11B 5/42
[52] U.S. Cl. ........................................ 29/603.06; 360/104
[58] Field of Search ............................ 29/603.04, 603.05, 29/603.06; 360/103, 104

[56] References Cited

U.S. PATENT DOCUMENTS 5,019,931 5/1991 Ohwe et al. ............................ 360/104

Primary Examiner—Carl E. Hall
Attorney, Agent, or Firm—Michaelson & Wallace

[57] ABSTRACT

A head-gimbal assembly for suspending a magnetic head over a spinning disk in a magnetic disk drive having head suspension positioning apparatus includes a base plate fastenable to the positioning apparatus in the magnetic disk drive, a load beam coupled at one end thereof to the base plate and a first dimple in the load beam at another end thereof, a flexible gimbal coupled to the load beam near the other end thereof and a second dimple in the gimbal having a concave surface facing a convex surface of the first dimple and a convex surface to which the magnetic head is attachable. Preferably, the convex surface of the first dimple has a radius smaller than a radius of the concave surface of the second dimple. The head is attached to the gimbal by an adhesive material attached to the convex surface of the second dimple and a top surface of the magnetic head. The adhesive material is hardened while a bottom surface of the head and the base plate are held in a predetermined attitude relative to one another (e.g., parallel to one another). Preferably, a predetermined force is applied to the head-gimbal interface while the adhesive material hardens corresponding to (e.g., equal to) an operational force exerted on the head-gimbal interface during operation of the magnetic disk drive.

3 Claims, 2 Drawing Sheets

METHOD OF MAKING A MAGNETIC HEAD GIMBAL SUSPENSION ASSEMBLY WITH DOUBLE DIMPLE

This is a division of application Ser. No. 08/447,682, filed May 23, 1995, now abandoned, which is a continuation of application Ser. No. 08/189,977, filed Feb 1, 1994, now abandoned.

BACKGROUND OF THE INVENTION

1. Technical Field

The invention is related to a suspension assembly for a direct access storage device such as a magnetic disk drive having a magnetic head and in particular to a head-gimbal assembly (HGA) thereof.

2. Background Art

The sub-micron spacing between the magnetic recording head and spinning disk in a direct access storage device (DASD) such as a hard disk drive is maintained by an air bearing and must remain within a narrow specified range for the DASD to function as designed. For this purpose, the generally flat bottom surface of the magnetic head must be held at some precisely specified orientation relative to (e.g., parallel to) the surface of the spinning disk.

Referring to FIGS. 1 and 2, a head-gimbal assembly (HGA) 10 includes a base plate 20 with a boss 25. The base plate 20 is installed in a DASD by fastening it to a positioning apparatus or structure 30 of the DASD which holds the base plate 20 parallel to the spinning disk 35 below. A magnetic head 40 is coupled to the base plate 20 by a gimbal 45 and load beam 50. The magnetic head 40 is bonded to the gimbal 45 by an adhesive or glue 55. Deflection of the gimbal 45 toward the load beam 50 is limited by a dimple 60 which permits some pitch and roll of the elastic gimbal 45 relative to the load beam 50. Ideally, the magnetic head 40 is parallel to the disk 35 as long as the base plate 20 is parallel to the disk 35. This ideal state is realized, however, only if the gimbal 45 and the load beam 50 are both perfectly straight so that the magnetic head 40 is parallel to the base plate 20. In practice, the mass production of the HGA 10 is characterized by a statistical distribution of deviations of the magnetic head 40 from the desired parallel orientation relative to the base plate 20. For example, as shown in FIG. 2, the load beam 50 may be twisted, so that the head 40 is held at a slight roll angle relative to the base plate 20.

The HGA 10 is installed in a DASD including the disk 35 and the positioning apparatus 30. The disk 35 begins spinning at the specified rate to form an air bearing under head 40 which lifts the head 40 slightly above the surface of the disk 35. During DASD assembly, the load beam 50 is deflected from its equilibrium position (dashed line of FIG. 1) through an angle A, thereby generating a force proportional to this deflection which presses the head 40 against the air bearing over the disk 35. If there is a slight twist in the load beam 50 (as illustrate in FIG. 2), this force rotates the head 40 to be almost parallel to the disk 35 as shown in FIG. 3, thereby elastically deforming the gimbal 45. However, the air bearing between the disk 35 and head 40 permits the head 40 to rotate slightly out of the design orientation in response to the elastic moment exerted by the gimbal 45 (i.e., the moment opposing the elastic deformation). This situation is indicated in FIG. 3 by the force vectors of different magnitudes exerted by the air bearing near opposite edges of the head 40. (Each force vector depicted in the drawing represents the integrated pressure under each one of the slider rails 41, 42.) As a result, the gap between the head 40 and disk 35 deforms by a small angle in the direction of the applied moment. In many cases, this angular deformation is sufficient to degrade the ability of the head 40 to magnetically read or write on the disk 35.

Such degradation has seemed to be unavoidable because it has not been possible to form perfectly shaped load beams and gimbals in mass production of HGAs. Accordingly, there is a need to provide better head-to-disk alignment unaffected by structural imperfections in the suspension, such as the twist in the load beam 50 illustrated in FIG. 2.

SUMMARY OF THE DISCLOSURE

A head-gimbal assembly for suspending a magnetic head over a spinning disk in a magnetic disk drive having head suspension positioning apparatus includes a base plate fastenable to the positioning apparatus in the magnetic disk drive, a load beam coupled at one end thereof to the base plate and a first dimple in the load beam at another end thereof, a flexible gimbal coupled to the load beam near the other end thereof and a second dimple in the gimbal having a concave surface facing a convex surface of the first dimple and a convex surface to which a top surface of the magnetic head is bondable. Preferably, the convex surface of the first dimple has a radius smaller than a radius of the concave surface of the second dimple. The head is bonded to the gimbal by an adhesive material attached to the convex surface of the second dimple and a top surface of the magnetic head. The adhesive material is hardened while the head and the base plate are held in a predetermined attitude relative to one another (e.g., parallel to one another). Preferably, a predetermined force is applied to the head-gimbal interface while the adhesive material hardens corresponding to (e.g., equal to) a force exerted on the head-gimbal interface under DASD operating conditions. Bonding under the influence of such a force overcomes effects of misalignment between the first and second dimples.

DETAILED DESCRIPTION OF THE PREFERRED EMBODIMENTS

Figure 4:
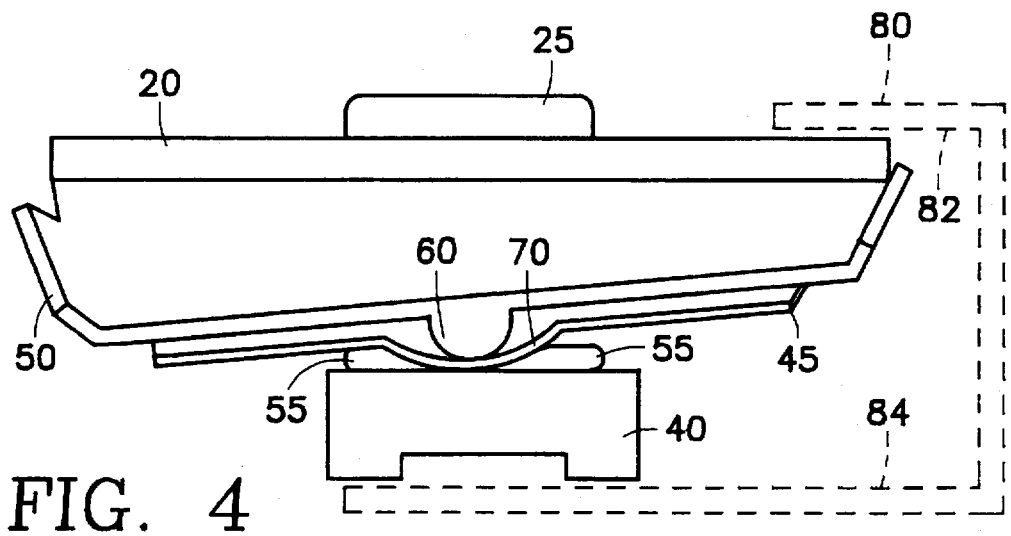
FIG. 4 illustrates one embodiment of the invention.

Referring now to FIG. 4, the problems discussed with reference to the previous figures are overcome by employing a double dimple suspension having a pair of dimples including the dimple 60 in the load beam 50 and a second dimple 70 in the gimbal 45. The load beam gimbal 60 has a convex surface facing the a concave surface of the gimbal dimple 70 while the gimbal dimple 70 has a convex surface resting on the upper surface of the head 40 and bonded thereto by the adhesive 55. The radius of the gimbal dimple 70 is greater than the radius of the load beam dimple 60 to ensure free rotation of the gimbal 45 relative to the load beam 50. The radius of the top surface of the head 40 is greater (i.e., virtually infinite) than the radius of the gimbal dimple, ensuring free rotation of the gimbal 45 relative to the head 40 in absence of the adhesive 55.

In the present invention, perfect alignment of the head 40 relative to the base plate 20 impervious to imperfections in the load beam 50 or gimbal 45. This advantage of the invention is achieved by bonding the head 40 to the gimbal 45 while temporarily holding the bottom surface of the head 40 and the top surface of the base plate 20 in a manufacturing fixture 80 (dashed line in FIG. 4) having a pair of surfaces 82, 84 contacting the base plate 20 and head 40 respectively. The surfaces 82, 84 of the fixture 80 are precisely oriented with respect to each other (e.g., parallel to each other in the embodiment of FIG. 4). Once the fixture 80 is attached as shown in FIG. 4, the glue 55 is applied to the interface between the gimbal 45 and the head 40 (including the gimbal dimple 70) and allowed to cure. In the ideal case in which the centers of both dimples 60, 70 are in vertical registration, the head 40 is permanently aligned relative to the base plate 20 in a specific orientation (e.g., a parallel orientation in the embodiment of FIG. 4) after the glue 55 has cured and the fixture 80 withdrawn, so that the head 40 assumes the same orientation (e.g., parallel) relative to the disk 35 upon installation of the HGA 10 into the DASD.

Figure 5:
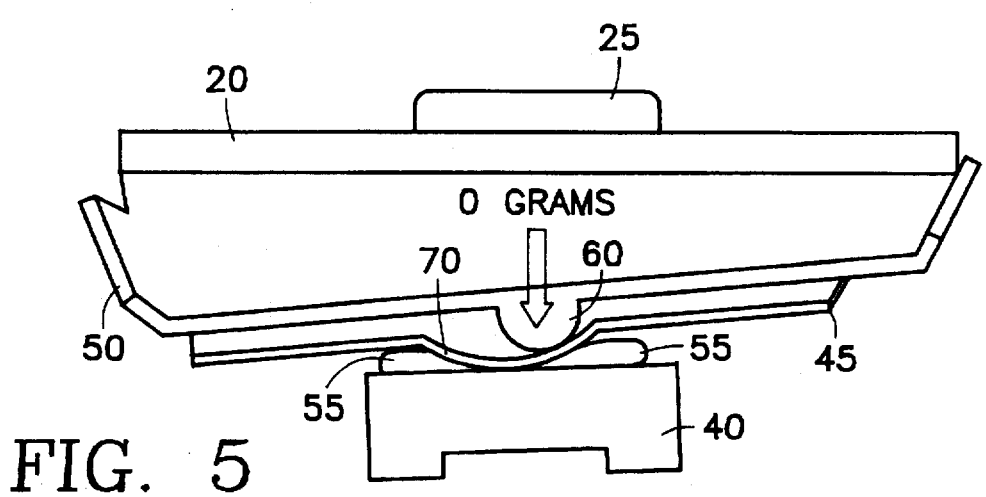
FIG. 5 illustrates a case of dimple misalignment in the present invention.

However, as illustrated in FIG. 5, the two dimples 60, 70 may be misaligned due to mass production imperfections. This misalignment would generate a moment acting on the gimbal during DASD operation. The moment would deform the gimbal 45 by an amount proportional to the magnitude of the force pressing the head 40 against the air bearing over the disk 35. Such a gimbal deformation would take the air bearing surface of the head 40 out of its design orientation relative to the surface of the disk 35, leading to an undesireable moment acting on the head 40 during DASD operation.

Figure 6:
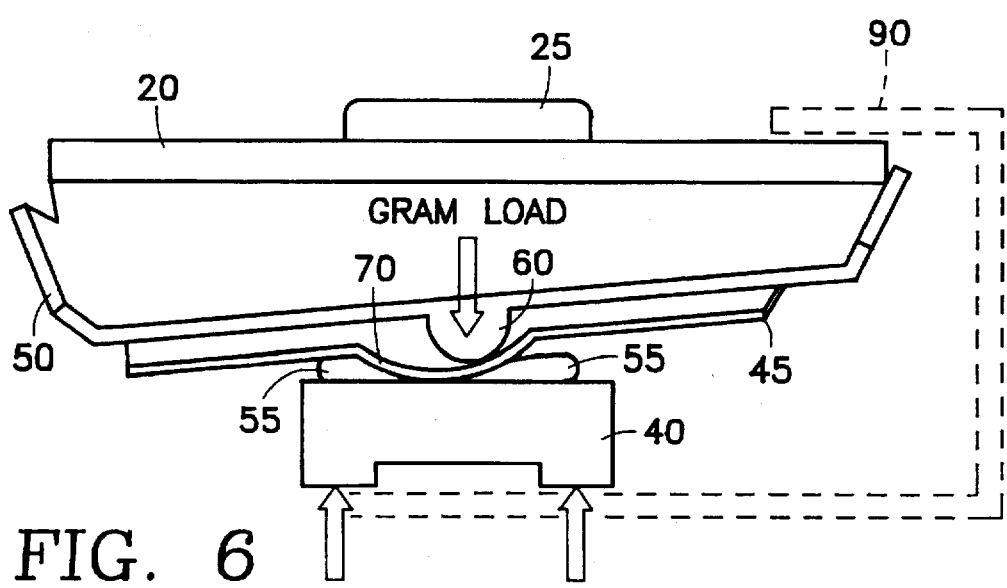
FIG. 6 illustrates the HGA of FIG. 5 in the preferred embodiment mounted in the DASD during operation.

This problem is avoided in the preferred embodiment of the present invention during application and curing of the glue 55 as illustrated in FIG. 6 by employing a manufacturing fixture 90 similar to the manufacturing fixture 80 of FIG. 4 but having the added feature that it applies precisely the same force to the head-gimbal interface that is later exerted on the head-gimbal interface under DASD operating conditions. As a result, the deformation of the gimbal 45 while the head 40 is held parallel to the base plate 20 during curing of the glue 55 is exactly the same deformation that occurs after installation of the HGA 10 into the DASD.

Figure 1:
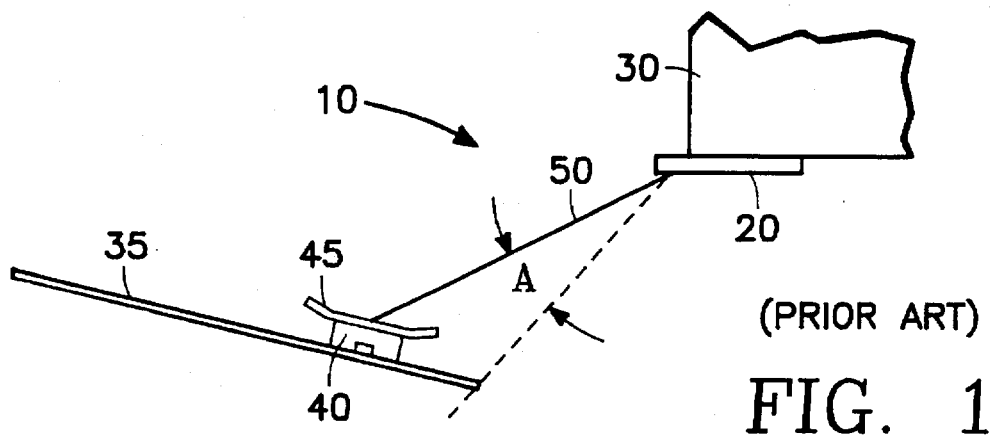
FIG. 1 illustrates an HGA of the prior art mounted in a DASD.

This guarantees that, after installation of the HGA into the DASD and whenever the disk 35 is spinning, the head 40 returns to its correct (design) orientation regardless of the amount of misalignment between the two dimples 60, 70, and without requiring the air bearing in the head-gimbal interface to resist any torque caused by the elastic resistance of the gimbal 45 to its enforced return to the correct orientation. This situation is indicated in FIG. 6 by two equal upward force vectors near opposite edges of the head 40 (representing the integrated air bearing pressure under each one of the bottom rails 41, 42 of the head 40) and a downward force vector equal to the opposing force exerted by bending of the load beam 50 through the angle A (FIG. 1).

As in the previous figures, FIG. 6 indicates a slight twist or imperfection in the load beam 50. Thus, perfect alignment of the head 40 relative to the spinning disk is achieved under DASD operating conditions in the embodiment of FIG. 6 despite two structural imperfections, namely a twist deformity in the load beam 50 and a misalignment between the two dimples 60, 70.

It should be noted that, in the prior art, the alignment of the bottom surface of the head, with respect to the DASD frame, is affected by misalignment between the top and bottom surfaces of the head. As a result, some variations in head air, bearing surface orientation occurred due to misalignment between the top and bottom surfaces of the head. The present invention completely eliminates this problem because the bottom surface of the head is the only head surface that is aligned and the orientation of the top surface does not affect this alignment.

Figure 2:
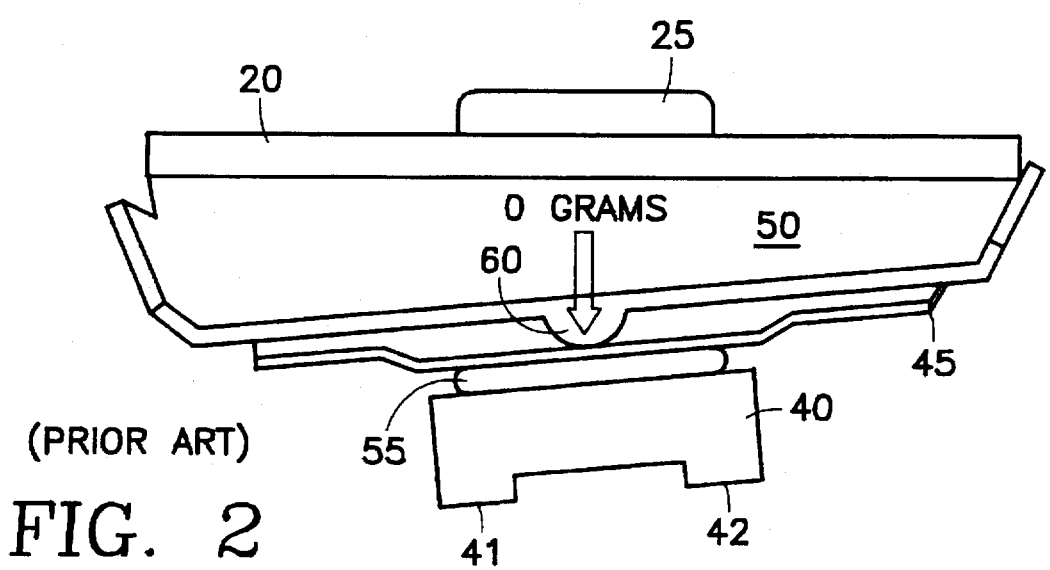
FIG. 2 illustrates the HGA of FIG. 1 unmounted.
Figure 3:
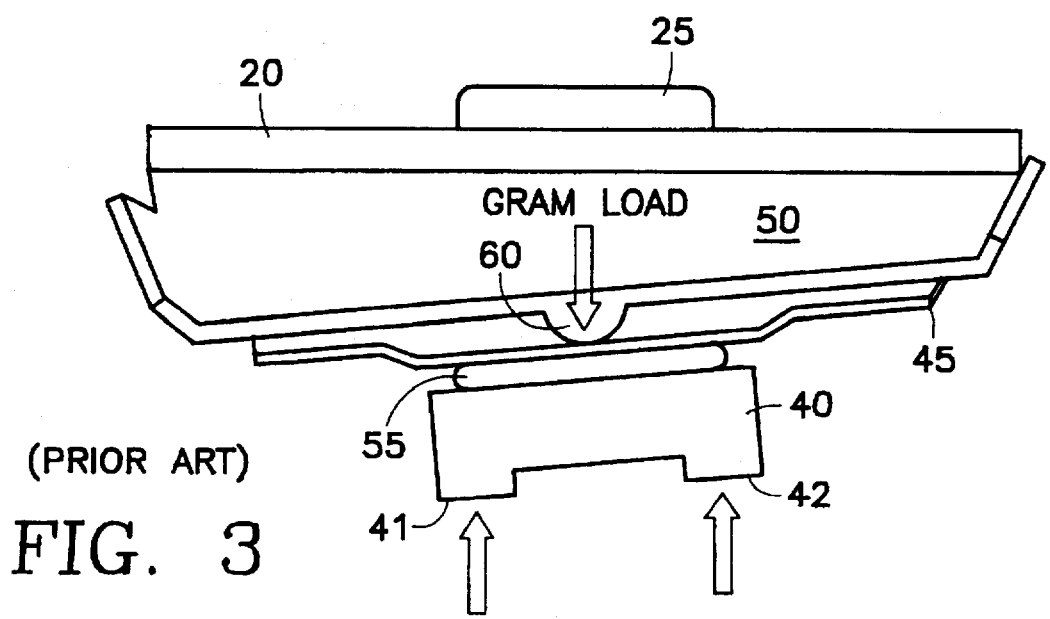
FIG. 3 illustrates the HGA of FIG. 2 mounted in the DASD during operation.

The revolutionary advantages of the invention corresponding to the preferred embodiment of FIG. 6 have been observed by comparing actual performance with prior art (single dimple). HGAs corresponding to FIG. 2. The standard deviation of the roll and pitch flying attitudes of the single dimple HGA head relative to the spinning disk were 0.85 micro-inches and 1.34 micro-inches, respectively, while the standard deviation of the pitch and roll attitudes of the double dimple HGA head relative to the spinning disk were only 9.41 micro-inches and 0.93 micro-inches, respectively, a reduction of 40% and 31%, respectively. Similarly, the standard deviation in measured flying height of the single dimple HGA head above the spinning disk was 0.47 while for the single dimple HGA head the standard deviation was 0.32, a reduction of 32%.

In one working example, the load beam was formed of 0.025 inch thick stainless steel, the gimbal was formed of 0.012 inch thick stainless steel, the radius of the load beam dimple 60 was 0.005 inch and the radius of the gimbal dimple 70 was 0.010 inch. The adhesive material 55 may be epoxy or cyanoacrylate.

While the invention has been described in detail by specific reference to preferred embodiments, it is understood that variations and modifications may be made without departing from the true spirit and scope of the invention.

What is claimed is:

1. A method of making a head gimbal assembly capable of suspending a magnetic head over a spinning disk in a magnetic disk drive having head suspension positioning apparatus, comprising the steps of:

providing a base plate;

providing a load beam coupled at one end thereof to said base plate and providing a first dimple in said load beam at another end thereof;

providing a flexible gimbal coupled to said load beam near the other end thereof and providing a second dimple in said gimbal having a concave surface facing a convex surface of said first dimple and a convex surface to which one surface of said magnetic head is attachable;

attaching said magnetic head to said flexible gimbal while holding said head in a predetermined attitude relative to said base plate;

wherein said head and said gimbal are separated by a head-gimbal interface therebetween and wherein said attaching step is performed while a predetermined force is applied to said head-gimbal interface.

2. The method of claim 1 wherein said predetermined force corresponds to an operational force exerted on said head-gimbal interface after installation of said head gimbal assembly in said magnetic disk drive.

3. The method of claim 2 wherein said predetermined force at least nearly equals said operational force.

* * * * *